Jan. 30, 1940.  H. A. SOULIS  2,188,727
FIFTH WHEEL
Filed June 19, 1937  3 Sheets-Sheet 1
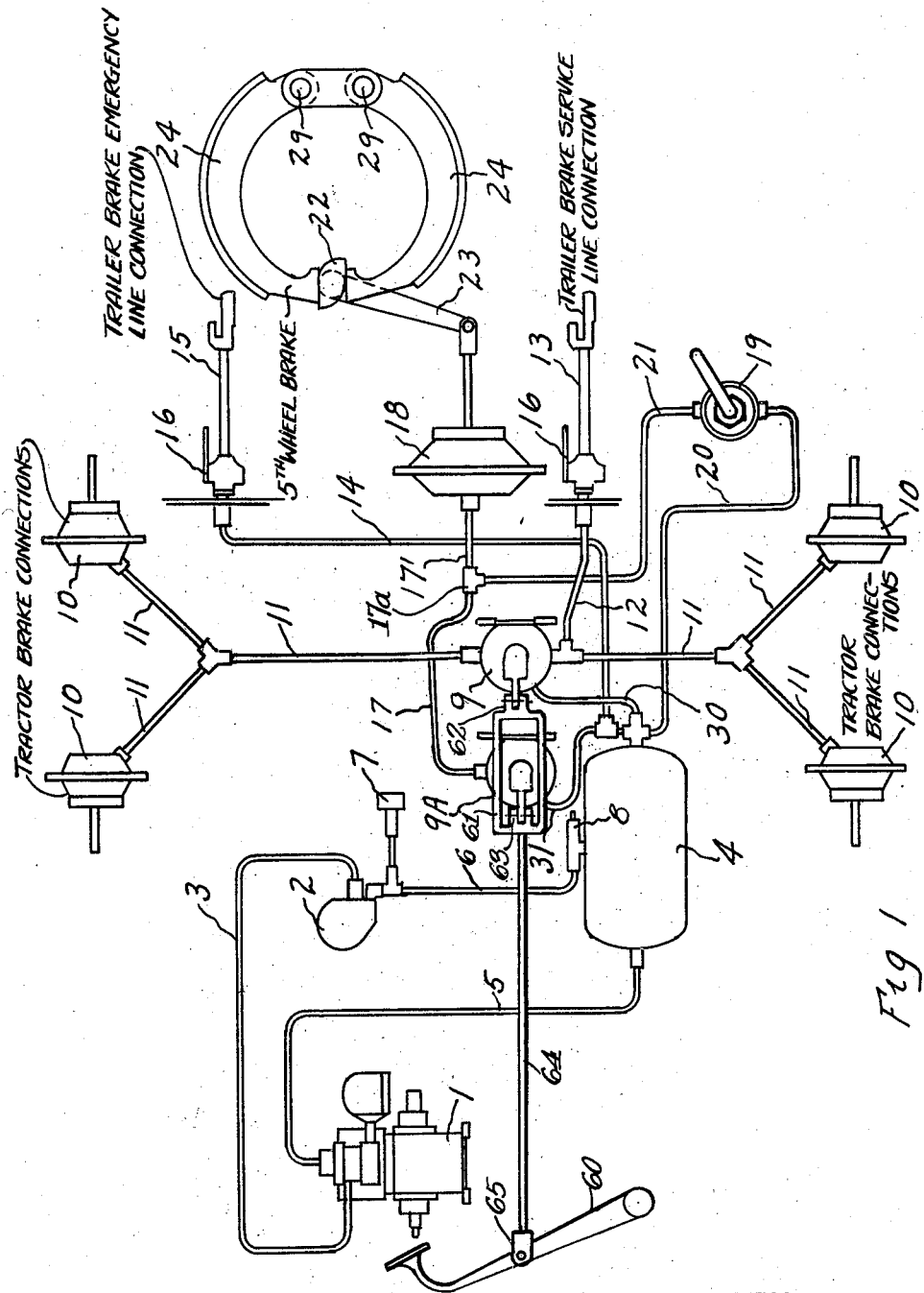
INVENTOR
Harold A. Soulis.

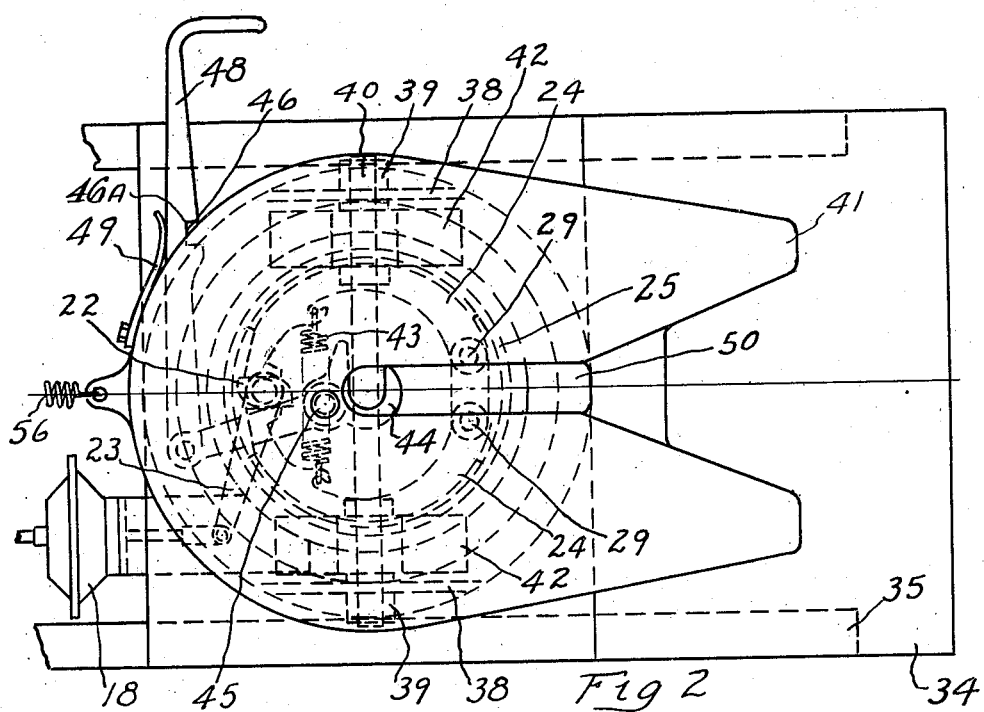
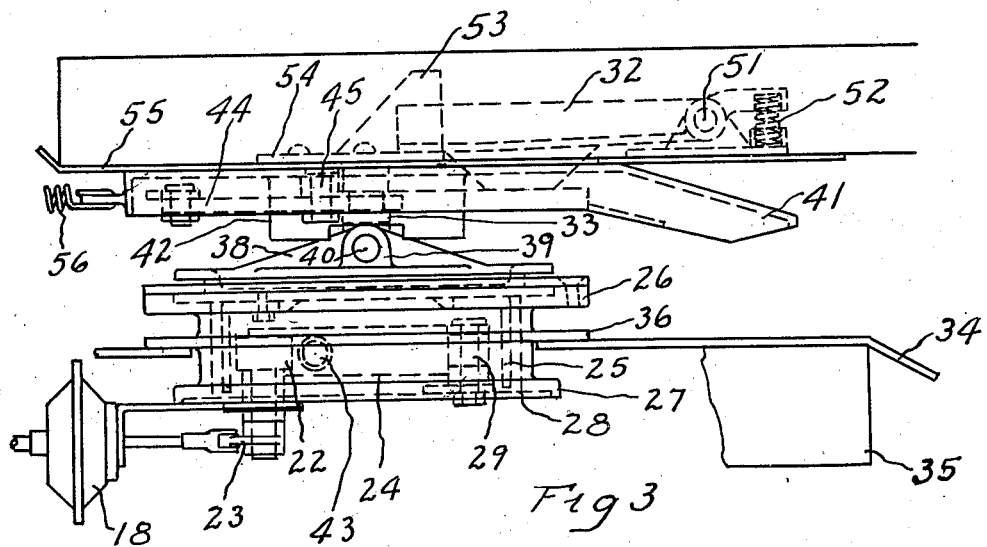

Jan. 30, 1940.                H. A. SOULIS                2,188,727
                               FIFTH WHEEL
                          Filed June 19, 1937         3 Sheets-Sheet 3

INVENTOR
Harold A. Soulis

Patented Jan. 30, 1940

2,188,727

UNITED STATES PATENT OFFICE 2,188,727

FIFTH WHEEL

Harold A. Soulis, Westfield, N. J.

Application June 19, 1937, Serial No. 149,132

16 Claims. (Cl. 188—3)

The purpose of this invention is to provide means to control the relative rotative movement of the tractor and the semi-trailer about the king pin of the fifth wheel. In the operation of a tractor-trailer upon the highways there is danger of the tractor-trailer jack-knifing when the brakes are applied, especially when the vehicle is rolling over a slippery surface. The tractor skids around in one direction and the semi-trailer at the same time skids in the opposite direction, until it ends up against the cab or some other projecting part of the tractor. Jack-knifing naturally results from instability of the tractor-trailer train in motion. It is a general principle of stability of motion that if the point of application of the driving force or propelling force is located ahead of the point or points where the resistance to motion is encountered, the motion is stable, or the moving body is in stable equilibrium. In the opposite case, when the point of application of the driving force is located behind the point or points where the resistance to motion is encountered, then the motion is inherently unstable, unless the moving body or vehicle is positively guided. When the tractor-trailer is operating over slippery roads and the brakes are applied on the wheels of the vehicle, the tractor brakes will exert a greater retarding effort than the semi-trailer brakes and the inertia of the semi-trailer will tend to skid the trailer wheels causing a so-called jack-knife. The skid of the semi-trailer wheels on a slipping surface is apt to happen with a sudden action, beyond the driver's control due to the fact the tires have no more resistance to side motion than that of going ahead. However, tractor-trailer trains in which brakes are applied to the trailer wheels only, are not in practical use, because of the excessive tire wear and the vehicle would be inadequate for safety at higher speeds, due to lack of sufficient retarding effort. Therefore both tractor and semi-trailer brakes must be used, as the forces which keep the tractor-trailer train in motion act at the centers of gravity of the tractor and of the semi-trailer respectively, and if the coupling or king pin axis moves even slightly from the line connecting the two centers of gravity, a jack-knifing effect is produced, in that both units tend to pivot around their forward ends, in opposite directions, the turning moment on both increasing with the angle between their axis. Therefore, in my invention I lock the tractor and the semi-trailer against rotation with respect to each other automatically when the brakes are applied. This same resistance to pivoting may be used at any time it is deemed necessary by the driver, by the use of a manually operated hand valve. Operating conditions are at times, conductive to jack-knifing of the tractor-trailer train, even when operating over a dry surface. Loss of life and property would be eliminated by the use of my invention and would therefore make tractor-trailer train operation safe on the public highways.

It is the object of my invention to provide a tractor-trailer train with a lower fifth wheel that can be locked to the upper fifth wheel of a tractor-trailer train, so as to turn together when in a coupled position. To accomplish this I mount the lower fifth wheel on a rotative base having means to apply brakes against rotation. The rotative base brake is actuated by the same power braking system used to decelerate the vehicle. This power means can be compressed air, vacuum, hydraulic, electrical, mechanical or manual means. The power means for the fifth wheel rotative base brake is applied automatically when power is applied to the tractor brakes or by operating a separate valve manually when it is desired to hold the lower fifth wheel against rotation, as in coupling the tractor to the semi-trailer. The amount of braking effort that is supplied to the fifth wheel rotative base brake can be varied to give greater or less resistance to the fifth wheel rotative base brake so that the amount of resistance can be set up to suit the operating or vehicle requirements. The upper fifth wheel can also be mounted on a rotating base, having means to brake against rotation, if desired.

It is not necessary to have a friction brake in my device as the same results may be obtained by a locking arrangement or by restricting the flow of a fluid from a high pressure to a non-pressure side of a jack-knife resisting device, when used in resisting a turning movement about the king pin or coupling device of a tractor-trailer train and applied at a predetermined time.

It is my object to control the tractor-trailer train in operating over a highway having a surface that is slippery, or over a dry surface where the tractor-trailer train might jack-knife, so as to keep the semi-trailer from jack-knifing the tractor, automatically when applying the vehicle brakes, because of the fact that the brake on the fifth wheel is applied at the same instant that the vehicle brakes are applied. Therefore, it does not allow time for the inertia of a semi-trailer to jack-knife the vehicle. The brake on the fifth wheel can also be used in spotting the semi-trailer and in holding the fifth wheel from rotation when picking up a semi-trailer. I have elected to show the power means on my fifth wheel actuated by compressed air, although vacuum, hydraulic, electric or mechanical means may be used with equal success.

Other designs can be used to mount the brake to prevent jack-knifing of the tractor-trailer train in which the brake or lock may be mounted on the tractor or semi-trailer. However, it is one of the principal objects of my invention to utilize the brake energy means to actuate the jack-knifing preventing devices simultaneously with an application of the brakes on the tractor, or otherwise.

Other objects and advantages from the utilization of my invention will doubtless present themselves as the description proceeds, and I would have it clearly understood that I reserve unto myself all rights to the full range of equivalents, both in manner of practicing my invention and its use, to which I may be entitled under my invention in its broadest aspect. For the purpose of the present disclosure, I have elected to describe a certain preferred design. However, as previously pointed out, this is not to be interpreted as a limitation of the scope of my invention, which may be followed with equal success in the manufacture of fifth wheels or systems for controlling tractor-trailer highway vehicles.

In the drawings:

Fig. 1 is a conventional schematic diagram of an air braking system showing the manner of connecting and applying the compressed air used in the system to the fifth wheel brake to control lateral motion of the tractor-trailer train about the king pin or coupling.

Fig. 2 is a plan view of the lower fifth wheel, showing the assembly mounted on the pick-up plate and the tractor frame.

Fig. 3 is a side elevation of Fig. 2, showing the lower fifth wheel coupled to the upper fifth wheel with the upper and lower fifth wheel lock pawl in place. This view also shows the upper fifth wheel mounted on the front end of the semi-trailer.

Figure 4:
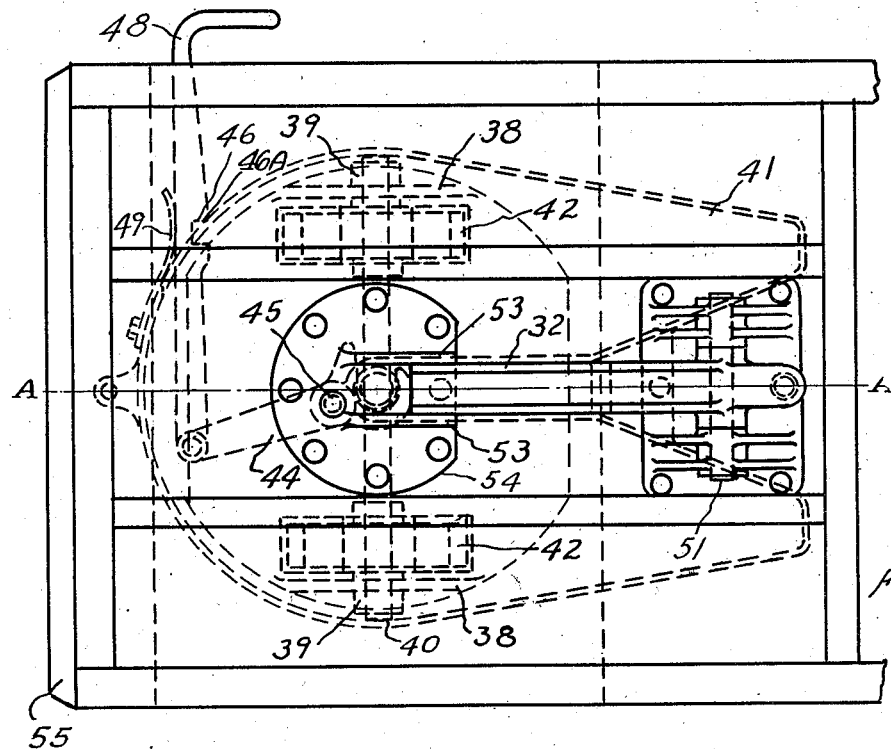
Fig. 4 is a plan view of the upper fifth wheel and locking pawl. The lower fifth wheel is shown dotted in position.

In Figure 1 a compressor is indicated at 1, which is driven directly from the engine crankshaft or from one of the auxiliary shafts, furnishes compressed air for brake operation with a governor indicated at 2 serves to regulate the pressure of the air in the reservoir, indicated at 4, pressure between minimum and maximum settings. In operation the governor 2 functions though pipe 3, to unload the compressor discharge valves when 100 to 105 pounds of air pressure in reservoir 4 is reached. The compressor 1 is connected through pipe 5 to reservoir 4. Reservoir 4 is connected to governor 2 through pipe 6. Gauge 7 is connected into pipe 6, and indicates the air pressure in reservoir 4. Reservoir 4 safety valve 8 protects against the possibility of excessive pressure in the reservoir and complies with certain State laws. The brake valve indicated at 9 controls the brake operation by directing the flow of air from reservoir 4 to brake chambers 10 in brake application and from brake chambers 10 to atmosphere in release, has pipe 30 connecting it to reservoir 4. Brake valve 9 has outlets connected to brake power chambers 10 which in turn connect to levers to apply power to the tractor brakes through pipes 11. The chambers, one for each wheel, convert the stored energy of the compressed air into mechanical force to apply the brakes.

Figure 5:
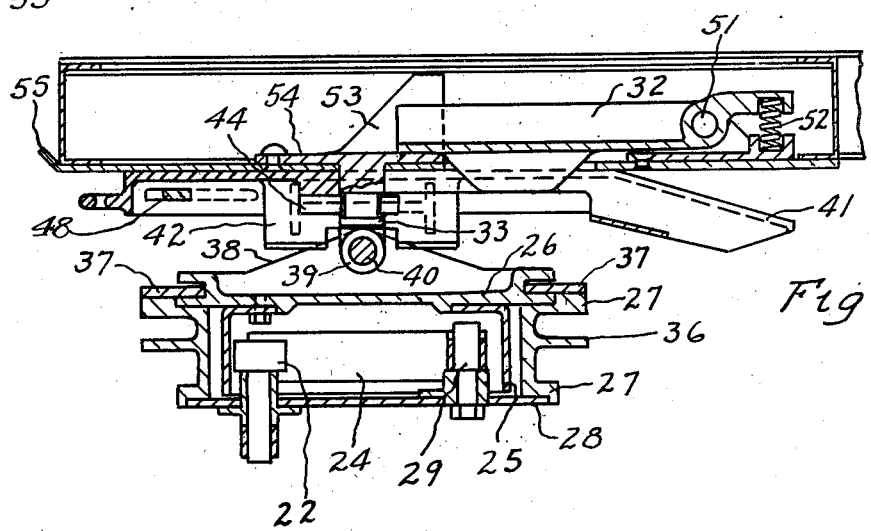
Fig. 5 is a sectional elevation through A A of Fig. 4 showing the lock pawl, upper and lower fifth wheel and the rotary base with the brake used to control the jack-knifing of the semi-trailer.

Pipe 12 connects the semi-trailer service line connection 13 while pipe 14 connects the semi-trailer emergency line 15 to the reservoir 4. 16 indicates cut-out cocks to the semi-trailer connections. Pipe 17, 17' connects the brake valve 9A to fifth wheel brake power chamber 18, while pipe 31 connects the brake valve 9A to reservoir pipe 4. Brake valves 9 and 9A are connected to the brake pedal of the tractor so as to operate simultaneously, as hereinafter described. At 19 is shown a hand control valve connected to reservoir 4 by pipe 20 and to fifth wheel power chamber 18 by pipe 21 and pipe section 17. Parts indicated by numerals 1 to 21 inclusive are commercial parts now on the market. In operation brake valve 9 is actuated to allow compressed air to flow through pipes 11 to the tractor brake chambers 10 and through pipes 12 to trailer connection 13 to apply the vehicle decelerating means. At the time of opening the brake valve 9, brake valve 9A is also opened to allow air to flow through pipes 31 and 17, 17' to fifth wheel brake chamber 18 which turns brake cam 22 by means of a partial rotation of lever 23. Cam 22 forces fifth wheel brake shoes 24 against a drum 25, fixed to the lower fifth wheel rotary base 26. Fifth wheel brake shoes 24 are fixed to lower fifth wheel base 27 through plate 28 to which it is attached, by means of anchor pins 29, on which they are fulcrumed at the opposite end to that of the cam application. Parts 25 to 28 inclusive are shown in Figure 5. To release the brakes, brake valve 9 is allowed to close the compressed air passages to release the air in chambers 10 through the exhaust port in the brake valve 9. To release the fifth wheel brake, brake valve 9A is allowed to close the compressed air passages to release the air in chamber 18 through the exhaust port in brake valve 9A. Brake valves 9 and 9A are connected to the usual pedal 60 in the tractor cab so that they both operate together. This may be accomplished by means of a yoke-like fitting 61, embodying bifurcated portions 62 and 63, within which the levers of the respective valves 9 and 9A are pinned for relative pivotal movement, a rod 64 threaded into said fitting and having an articulated connection with said pedal arm, as at 65, interconnecting the pedal and fitting for conjoint movement. Should it be desired to function the fifth wheel brake chamber 18 without applying the tractor brake chambers 10, hand control valve 19 is operated manually, by the tractor driver and compressed air will flow through pipes 20 and 21 and 17' to fifth wheel brake chamber 18. By the application of compressed air to fifth wheel brake chamber 18, without applying the tractor brake chamber 10, hand control valve 19 is operated manually by the tractor driver and compressed air will flow through pipes 20 and 21 and 17' to fifth wheel brake chamber 18, which will apply fifth wheel brake shoes 24 against brake drum 25. To release the fifth wheel brake shoes 24, the hand control valve 19 is closed to allow the compressed air in chamber 18 and pipes 17' and 21 to flow to atmosphere. An automatic check-valve 17a is provided between the pipe sections 17 and 17', to relieve the pressure in the power diaphragms 18 and the pipe section 17' to permit the air to exhaust into the pipe section 17 or the pipe 21, as the case may be. As will be evident, when the fifth-wheel brakes are operated, through the functioning of the valve 9A, said check-valve 17a will become effective to close communication between the pipe section 17' and the pipe 21, while, if said brakes are operated through the medium of the manual control valve 19, the check-valve functions to close communication between the pipe sections 17' and 17, respectively. In Figures 2, 3 and 5, 22 indicate the brake cam which when actuated by power cylinder 18 through cam lever 23 shown in Figure 1, forces brake shoes 24 out and against brake drum 25 which is attached to lower fifth wheel rotary base 26 so as to resist the turning effort of the upper and lower fifth wheel due to the fact that lock pawl 32 will keep the upper and lower fifth wheel from rotating about king pin 33. In Figures 2 and 3 retracting spring 43 serves to release the shoes from contact with drum 25 when the power is released from chamber 18, this leaves the lower fifth wheel 41 free to turn in fifth wheel base 27. The lower fifth wheel base 27 is fixed to pick-up plate 34 at flange 36. Pick-up plate 34 is attached to the tractor frame 35. Pick-up plate 34 serves as a mounting for the lower fifth wheel and as an aid in coupling the tractor to the semi-trailer. Lower fifth wheel rotary base 26 is held in rotary position in fifth wheel base 27 by retaining plates 37. At 38 are brackets integral with fifth wheel rotary base 26, which carry losses 39 having a bearing hole for cross shaft 40, which supports the lower fifth wheel 41 through mounting brackets 42 shown in Figures 4, 5, 6 and 7. In the Figures 2, 3, 4 and 5, 44 indicated a lock to attach the upper fifth wheel through king pin 33 to lower fifth wheel 41. The lock 44 fulcrumed at 45 is retained in locking position through the medium of the latching notch 46 in the hand-actuatable lever 48 which is adapted to engage the nub or projection 46a on the fifth wheel element 41, the lever being held in its locking position by spring 49. To unlock the lower fifth wheel 41 from upper fifth wheel king pin 33, hand lever 48 is pulled off its notched position against spring 49 and the lock is pulled to an open position by fulcruming about fulcrum pin 45. Lower fifth wheel 41 has guide slot 50 through which king pin 33 is guided into position for coupling by lock 44. Guide slot 50 also serves as the locking slot for the reception of lock pawl 32. Lock pawl 32 is fulcrumed at 51 and is held in a locked position by spring 52, which tends to hold the engagement portion of the lock pawl 32 in a locked position. The lock pawl 32 is guided at its engagement and by lugs 53 which are integral with the king pin base 54. King pin base 54 is attached to the upper fifth wheel plate 55. Spring 56 attached at one end to the fifth wheel element 41 and at its other to the tractor cab, or any suitable fixed point in advance of said element, holds the lower fifth wheel 41 in the proper position for coupling of the tractor to the semi-trailer when in an uncoupled position. In coupling the tractor to the semi-trailer lock pawl 32 falls in slot 50 in the lower fifth wheel 41 which will lock the upper and lower fifth wheel against relative radial motion. When the tractor brakes are applied the fifth wheel brake will resist any tendency for the semi-trailer and tractor to jackknife due to the application of the brake effort on the rotative brake 26 when decelerating the vehicle.

Having described my invention, I claim:

1. In a tractor-trailer train having a vehicle braking system, a fifth wheel having means synchronized to function with said braking system to apply resistance to a relative horizontal movement between the tractor and the semi-trailer, when a brake application is made on the tractor-trailer train.

2. In combination with a tractor and a trailer respectively embodying relatively rotatable elements constituting a fifth wheel, a braking system for retarding and arresting the movement of said tractor, a braking system for said trailer optionally operable with said tractor braking system and means synchronized with said tractor braking system for arresting the relative rotative movement of said fifth wheel forming elements solely in response to the functioning of said tractor braking system.

3. A means for retarding relative horizontal angular movement of a trailer and a self-propeller towing vehicle to which said trailer is coupled, including a fifth wheel between the trailer and the towing vehicle embodying relatively rotatable supporting and supported components, braking mechanism associated with said fifth wheel adapted to retard and arrest the relative rotative movement of said components and means for connecting said mechanism to the braking system of the towing vehicle to function in synchronization therewith.

4. The combination of a self-propelled towing vehicle having a braking system and a trailer having a braking system coupled thereto, said coupling including a fifth wheel and connections between the two braking systems, and braking means for said fifth wheel, effective to control the pivotal movement of said trailer on said fifth wheel, interconnected with the braking system of said towing vehicle, said latter means functioning in synchronism with the towing vehicle braking system, whereby the application of braking effort on said towing vehicle will simultaneously render said fifth wheel braking means effective.

5. A fifth wheel construction, as used in the coupling of a trailer to a self-propelled towing vehicle, comprising relatively rotatable members, means for controlling the relative rotative movement of said members and means for connecting said controlling means to the braking system of such towing vehicle to function in synchronism therewith.

6. A means for retarding relative horizontal angular movement between a trailer and a towing vehicle to which the trailer is coupled, including a fifth wheel between the trailer and the towing vehicle, embodying relatively rotatable supporting and supported components, braking mechanism associated with said fifth wheel adapted to retard the relative rotative movement of said fifth wheel components and means for connecting said mechanism to the braking system of the towing vehicle to function in synchronism therewith.

7. A fifth wheel construction, as used in the coupling of a trailer to a self-propelled towing vehicle having a braking system, comprising relatively rotatable members in bearing engagement, means for retardatively controlling the relative rotative movement of said members and means for connecting said controlling means to the braking system of the towing vehicle, whereby the application of the brakes of the towing vehicle will simultaneously function said controlling means to exert effort effective to retard the relative rotational movement of said fifth wheel members.

8. A fifth wheel construction, as used in the coupling of a trailer to a self-propelled towing vehicle having a braking system, including relatively rotatable members in bearing engagement, means for retardatively controlling the relative rotative movement of said members, means for connecting said controlling means to the braking system of the towing vehicle, whereby the application of the brakes of the towing vehicle will simultaneously function said controlling means to exert effort effective to retard the relative rotational movement of said fifth wheel members and means optionally operable to render said controlling means effective independently of the functioning of the towing vehicle braking system.

9. The combination with a towing vehicle having a braking system and a trailer of means for connecting said trailer to the towing vehicle, said means including a fifth wheel to provide for relative horizontal angular movement between the two vehicles and mechanism for retardatively controlling such movement, said mechanism being connectable to said towing vehicle braking system and functioning in synchronism therewith.

10. The combination with a towing vehicle having a braking system and a trailer, of means for connecting said trailer to said towing vehicle to provide for relative horizontal angular movement between the towing vehicle and the trailer during their conjoint operation and mechanism for retardatively controlling such movement, said mechanism being connectable to the braking system of said towing vehicle and becoming effective solely in response to the functioning of said braking system.

11. A fifth wheel construction for coupling a trailer to a towing vehicle having a braking system, including a unit adapted to be rigidly connected to the trailer and embodying a king-pin, a unit adapted to be mounted on such towing vehicle formed to receive the king-pin of the trailer unit to connect said units for relatively rotational movement, braking means cooperatively associated with one of said units and means for connecting said braking means to the braking system of the towing vehicle to operate in synchronism therewith, whereby relative horizontal angular movement of the vehicles coupled by said fifth wheel may be retarded simultaneously with the application of said braking system to the development of braking effort.

12. A means for retarding relative horizontal angular movement between a trailer and a towing vehicle to which the trailer is coupled, including a fifth wheel between the two vehicles, embodying relatively rotatable supporting and supported components, braking mechanism connected with said fifth wheel adapted to retard the relative rotative movement of said fifth wheel components and means for functioning said mechanism in response to the operation of the braking system of the towing vehicle or independently thereof.

13. A means for retarding relative horizontal angular movement between a trailer and a towing vehicle coupled by a fifth wheel, including interconnectable rotatable components, braking mechanism associated with said fifth wheel adapted to retardatively control relative movement of said fifth wheel components and means for connecting said mechanism to the braking system of the towing vehicle for operation in conjunction therewith.

14. A means for controlling relative horizontal angular movement between a trailer and a towing vehicle connected by a fifth wheel, embodying interconnectable relatively rotatable components, braking mechanism associated with said fifth wheel operable to retard relative movement of said fifth wheel components and means optionally operable for connecting said mechanism to the braking system of the towing vehicle for operation in conjunction therewith.

15. The combination with a towing vehicle having a fluid-operated braking system and a trailer, of means for connecting said trailer to the towing vehicle, said means including a fifth wheel, fluid-operated mechanism for retardatively controlling relative horizontal angular movement between the two vehicles on the axis of said fifth wheel and means for connecting said mechanism to said towing vehicle for operation therefrom.

16. A fifth wheel construction, as used in coupling a towing vehicle to a hauled vehicle, comprising relatively rotatable members, means for controlling the relative rotative movement of said members, and optionally operable means for connecting said controlling means to the braking system of the hauled vehicle to function in synchronism therewith, or for effecting the operation of said means independently of such braking system.

HAROLD A. SOULIS.